United States Patent
Nilsson et al.

(10) Patent No.: US 10,519,833 B2
(45) Date of Patent: Dec. 31, 2019

(54) SYSTEM AND METHOD FOR IMPROVING THE PERFORMANCE OF A SELECTIVE CATALYST REDUCTION SYSTEM IN A HEAT RECOVERY STEAM GENERATOR

(71) Applicant: GENERAL ELECTRIC TECHNOLOGY GMBH, Baden (CH)

(72) Inventors: John Nilsson, Wettingen (CH); Stefano Bernero, Oberrohrdorf (CH)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 582 days.

(21) Appl. No.: 15/188,515

(22) Filed: Jun. 21, 2016

(65) Prior Publication Data
US 2017/0362983 A1 Dec. 21, 2017

(51) Int. Cl.
*F01N 3/20* (2006.01)
*F01K 23/06* (2006.01)
*F01N 9/00* (2006.01)

(52) U.S. Cl.
CPC ............ *F01N 3/2066* (2013.01); *F01K 23/06* (2013.01); *F01N 3/208* (2013.01); *F01N 9/00* (2013.01);
(Continued)

(58) Field of Classification Search
CPC .......... F01N 3/2066; F01N 3/208; F01N 9/00; F01N 2610/02; F01N 2610/1453;
(Continued)

(56) References Cited

U.S. PATENT DOCUMENTS 7,824,636 B1 * 11/2010 Kraemer ................ B01D 53/30
422/108
8,087,172 B2 1/2012 Farris et al.
(Continued)

FOREIGN PATENT DOCUMENTS

| DE | 10 2015 011114 A1 | 3/2016 |
|---|---|---|
| EP | 2 434 118 A1 | 3/2012 |
| WO | 2011/060792 A2 | 5/2011 |

OTHER PUBLICATIONS

Extended European Search Report and Opinion issued in connection with corresponding EP Application No. 17176945.8 dated Sep. 22, 2017.

*Primary Examiner* — Phutthiwat Wongwian
*Assistant Examiner* — Loren C Edwards
(74) *Attorney, Agent, or Firm* — Grogan, Tuccillo & Vanderleeden, LLP

(57) ABSTRACT

A method for controlling emissions from a power plant having an ammonia injection grid that includes a plurality of ammonia injection points includes the steps of injecting ammonia into a flow of exhaust gas at an injection location, the injection of ammonia defining a spatial distribution of ammonia across an exhaust gas flowpath, measuring at least one parameter of the exhaust gas downstream from the injection location, comparing a measured value for the at least one parameter of the exhaust gas to a threshold value for the at least one parameter and, if the measured value for the at least one parameter exceeds the threshold value for the at least one parameter, automatically modifying the spatial distribution of ammonia injection across the exhaust gas flowpath.

7 Claims, 4 Drawing Sheets

(52) U.S. Cl.
CPC .... *F01N 2610/02* (2013.01); *F01N 2610/146* (2013.01); *F01N 2900/1402* (2013.01); *F05D 2220/72* (2013.01); *F05D 2270/082* (2013.01); *F05D 2270/0831* (2013.01); *Y02E 20/16* (2013.01); *Y02T 10/24* (2013.01); *Y02T 10/47* (2013.01)

(58) Field of Classification Search
CPC ....... F01N 2610/146; F01N 2900/1402; F05D 2220/72; F05D 2270/082; F05D 2270/0831; Y02E 20/16; Y02T 10/24; Y02T 10/47; F01K 23/10; F02C 3/34
USPC .......................................................... 60/301
See application file for complete search history.

(56) References Cited

U.S. PATENT DOCUMENTS

| | | |
|---|---|---|
| 8,132,750 B2 | 3/2012 | Stone et al. |
| 8,602,338 B2 | 12/2013 | Stone |
| 2004/0057888 A1 | 3/2004 | Buzanowski |
| 2016/0061079 A1 | 3/2016 | Wentzel et al. |
| 2016/0160725 A1 | 6/2016 | Hudgens et al. |

\* cited by examiner

SYSTEM AND METHOD FOR IMPROVING THE PERFORMANCE OF A SELECTIVE CATALYST REDUCTION SYSTEM IN A HEAT RECOVERY STEAM GENERATOR

BACKGROUND

Technical Field

Embodiments of the invention relate generally to power generation systems and, more particularly, to a system and method for improving the performance of a selective catalyst reduction system in a heat recovery steam generator.

Discussion of Art

Gas turbines have been widely used to provide electric power, usually as a standby for both peak power and reserve power requirements in the utility industry. Gas turbines are preferred because of their rapid starting capability and low capital cost. Conventional gas turbines, however, operate with reduced thermal efficiency due to the high exit temperatures of the exhaust gas stream and the resulting thermal loss. Therefore, a gas turbine is often combined with a heat recovery steam generator to improve overall system efficiency.

As is known in the art, a heat recovery steam generator generates steam utilizing the energy in the exhaust from the gas turbine. In a cogeneration mode, steam produced from the heat recovery steam generator can be used for process applications, whereas in a combined-cycle mode, power may generated via a steam turbine generator.

All combustion processes utilizing fossil fuels have the potential for producing emissions such as nitrogen oxides ($NO_x$) and carbon monoxide. This also applies to the combustion process in a gas turbine where there are high temperatures and high excess air levels. Accordingly, the exit gas from the gas turbine which flows into and through the heat recovery steam generator contains a significant quantity of $NO_x$ and carbon monoxide. Stringent environmental regulations for carbon monoxide and nitrogen oxides have led to the development of selective catalyst reduction (SCR) systems that have been integrated into heat recovery steam generators. SCR systems function to remove nitrogen oxides, for example, through a selective catalytic reduction process. Typically, ammonia is injected into the flue or exhaust gas passing through the heat recovery steam generator, which is then absorbed onto a catalyst, to convert the nitrogen oxides into nitrogen and water. The treated exhaust gas may then be exhausted to atmosphere.

In addition to controlling $NO_x$ emissions to within rather precise ranges, it is also desirable to minimize ammonia slip. Ammonia slip refers to emissions of unreacted ammonia that result from incomplete reaction of the $NO_x$ and the reagent. Ammonia slip can cause the formation of ammonium sulfates, which can plug or corrode downstream components, and can result in ammonia being absorbed into fly ash, which can affect disposal or reuse of the ash. Minimizing both ammonia slip and $NO_x$ emissions, however, are often competing objectives, which are made harder to meet by changing operating conditions, ageing of components, and other system variables.

In view of the above, there is a need for a system and method for improving the performance of a selective catalyst reduction system in a heat recovery steam generator. In particular, there is a need for a system and method of reducing $NO_x$ emissions while at the same time minimizing ammonia slip.

BRIEF DESCRIPTION

In an embodiment, a method for controlling emissions from a power plant having an ammonia injection grid that includes a plurality of ammonia injection points is provided. The method includes the steps of, with an ammonia injection grid having a plurality of ammonia injection points, injecting ammonia into a flow of exhaust gas at an injection location, the injection of ammonia defining a spatial distribution of ammonia across an exhaust gas flowpath, measuring at least one parameter of the exhaust gas downstream from the injection location, comparing a measured value for the at least one parameter of the exhaust gas to a threshold value for the at least one parameter and, if the measured value for the at least one parameter exceeds the threshold value for the at least one parameter, automatically modifying the spatial distribution of ammonia injection across the exhaust gas flowpath.

In another embodiment, a heat recovery steam generator is provided. The heat recovery steam generator includes a gas inlet for receiving a flow of exhaust gas from a gas turbine, a gas outlet opposite the gas inlet and configured to transport the flow of exhaust gas to atmosphere, an ammonia injection grid having a generally planar array of injection ports configured to inject ammonia into the flow of exhaust gas at various locations along a cross-section of an exhaust gas flow path, a measurement system located intermediate the ammonia injection grid and the gas outlet, and a control unit configured to receive emission measurement data from the measurement system and to modify a spatial distribution of ammonia from the ammonia injection grid in dependence upon the emission measurement data.

In yet another embodiment, a method for controlling emissions is provided. The method includes the steps of receiving first emission measurement data including at least first measured values for nitrogen oxide, ammonia and oxygen in a flow of exhaust gas, determining preliminary positions for flow control values of an ammonia injection grid based on historical valve positions stored in memory, controlling the flow control valves to the determined preliminary positions to provide a first spatial distribution of ammonia in a gas flow path, receiving second emission measurement data including at least second measured values for nitrogen oxide, ammonia and oxygen in the exhaust gas, comparing the second measured values to threshold values for nitrogen oxide, ammonia and oxygen, if at least one of the second measured values exceeds the corresponding threshold value, determining adjusted positions for the flow control valves, and controlling the flow control valves to the adjusted positions to provide a second spatial distribution of ammonia in the gas flow path, wherein the first spatial distribution of ammonia is different from the second spatial distribution of ammonia.

DRAWINGS

The present invention will be better understood from reading the following description of non-limiting embodiments, with reference to the attached drawings, wherein below:

DETAILED DESCRIPTION

Figure 1:
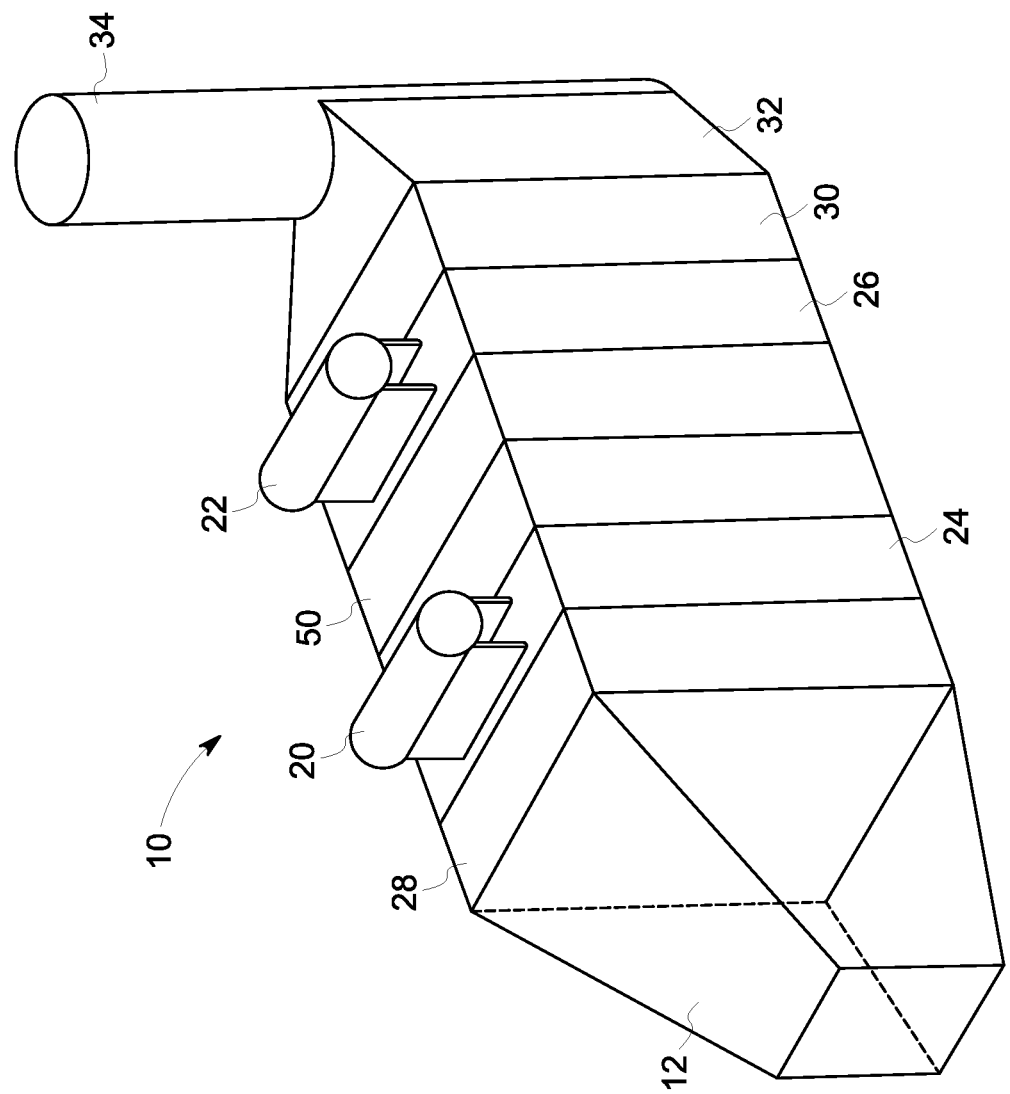
FIG. 1 is a schematic illustration of a heat recovery steam generator according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in a heat recovery steam generator or steam boiler of a combined cycle or cogeneration power plant employing gas turbines, embodiments of the invention may also be applicable for use in other gas turbine applications or other emission control applications.

As used herein, "upstream" and "downstream" refer to the flow direction of an exhaust gas from the gas turbine (i.e., exhaust gas flows from an upstream end of the heat recovery steam generator to a downstream end of the heat recovery steam generator). As used herein, "gas turbine" means a turbine driven by expanding hot gases produced by burning non-coal fuel such as, for example, petrol, natural gas, propane, diesel, kerosene, E85, biodiesel and biogas. As used herein, "fluidly coupled" or "fluid communication" refers to an arrangement of two or more features such that the features are connected in such a way as to permit the flow of fluid between the features and permits fluid transfer.

Figure 2:
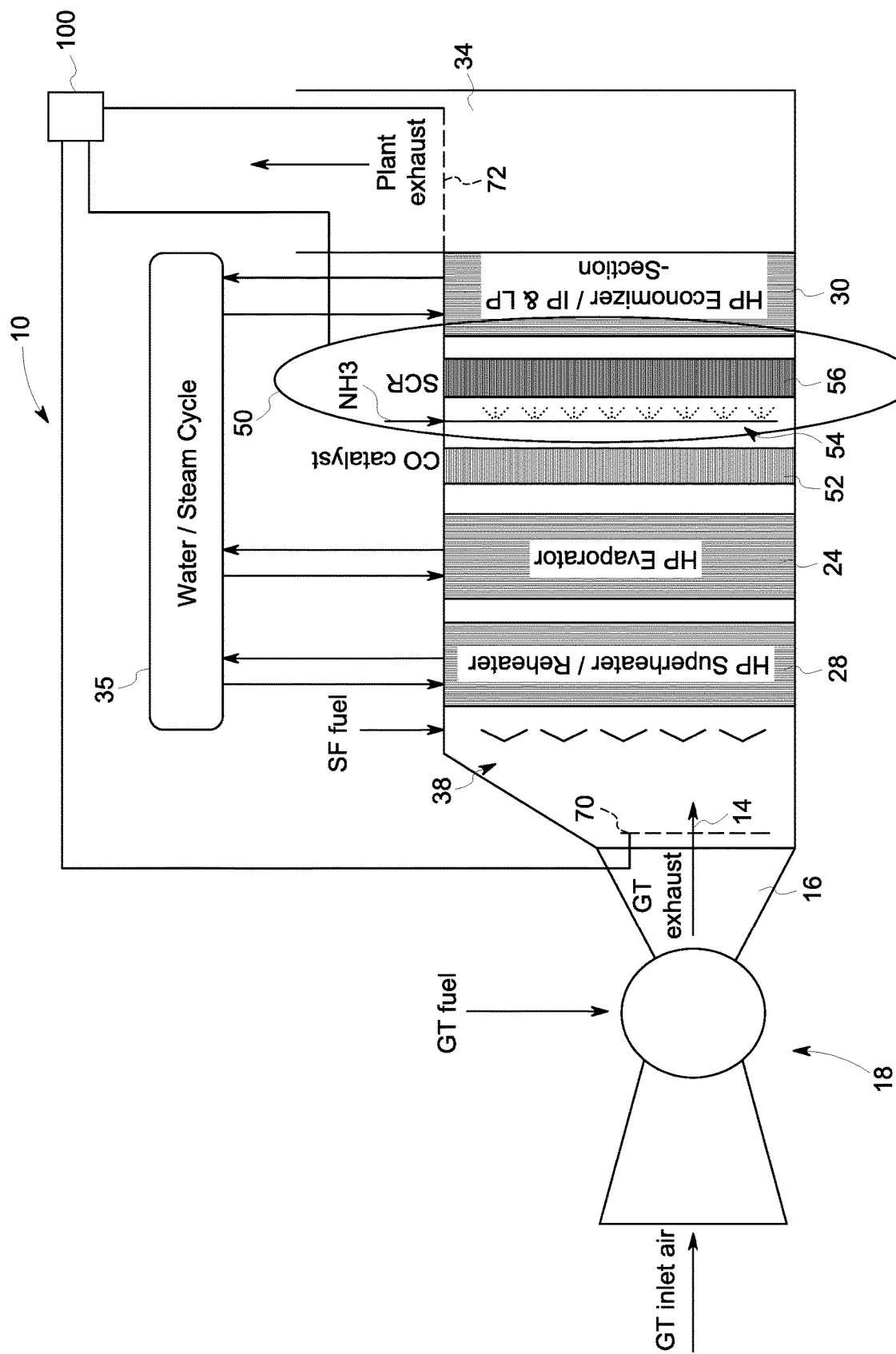
FIG. 2 is another schematic illustration of the heat recovery steam generator of FIG. 1, showing a system for improving the performance of a selective catalyst reduction system embodied in the heat recovery steam generator.

Embodiments of the invention relate to a system and method for improving the performance of the selective catalyst reduction system in a heat recovery steam generator. FIGS. 1 and 2 illustrates an exemplary heat recovery steam generator ("HRSG") 10 in which the system of the invention may be deployed. The HRSG 10 has an inlet plenum 12 which is supplied with combustion/exhaust gas 14 from an exhaust duct 16 of a gas turbine 18 which powers a generator (not shown). HRSG 10 may be of any known design and includes, for example, a high pressure drum 20, a low pressure drum 22, and associated heat exchanger surfaces including high and low pressure evaporators 24, 26, respectively, superheater 28, and economizer 30 surfaces in a conventional manner. After passing through the heat exchangers, the exhaust gases are directed through a transition piece 32 and are emitted to atmosphere via stack 34, as is known in the art. While the HRSG 10 is illustrated as a dual pressure HRSG having high pressure and low pressure sections, the invention is equally applicable to HRSGs having any number of pressure sections including, for example, a triple pressure HRSG having three pressure sections (i.e. a high pressure section, a low pressure section and an intermediate pressure section).

Each pressure section of the HRSG 10 is configured to transfer energy from the exhaust gas passing therethrough to a feedwater supply to make superheated steam to drive a steam turbine. More specifically, the evaporators or boiler sections (e.g., evaporators 24, 26) function to vaporize water and produce steam. The evaporators may include a bank of finned tubes which extend into the exhaust path from steam drums located at the top of the HRSG 10. Boiler feedwater is supplied to the steam drum(s) at an appropriate pressure, and circulates through the finned tubes of the evaporator. The circulating water absorbs heat from the gas turbine exhaust 14. The amount of heat absorbed by the water, and the amount of heat released by the exhaust gas to generate steam is a product of the mass flow rate of the exhaust gas, the average gas specific heat capacity, the temperature difference across the evaporator, and the surface are of the finned tubes.

The economizers (e.g., economizer 30) are typically installed downstream of the evaporators with which they are associated and function to further lower the temperature of the exhaust gas. Economizers are, similar to the evaporators, finned-tube gas-to-water heat exchangers and, in addition to lowering the temperature of exhaust gas, function to preheat the feedwater prior to its entry into the steam drums associated with the evaporators.

The superheater 28 is located upstream of the associated evaporator and functions to add sensible heat to dry steam produced by the evaporator and steam drum, superheating it beyond the saturation temperature for use by the steam turbine. In an embodiment, the superheater may include either a single heat exchanger module or multiple heat exchanger modules.

As illustrated in FIG. 2, the circulation of water through the HRSG 10 to produce steam defines a water/steam cycle 35. In particular, as exhaust gas 14 passes through the HRSG 10 from gas turbine 18 (i.e., the upstream end) to the stack 34 (i.e., the downstream end), feedwater is circulated through the economizers, evaporators (and steam drums associated therewith) and superheaters in a generally reverse direction, from the stack end of the HRSG to the gas turbine end of the HRSG. As the upstream end of the HRSG is at a higher temperature than the downstream end, the feedwater increases in temperature as it travels from the downstream end to the upstream end, generating steam along the way in the water/steam cycle 35 for subsequent use, such as in a steam turbine. Moreover, in an embodiment, the HRSG 10 may include a supplementary firing section 38 for further increasing the temperature of the exhaust gas 14 prior to entering the high pressure section of the HRSG 10.

With further reference to FIG. 2, the HRSG 10 includes a selective catalyst reduction system 50 that is configured to remove nitrogen oxides and carbon monoxide from the exhaust gas 14 before it exits the HRSG 10 through the stack 34. As best shown in FIG. 2, the SCR system 50 is located just upstream from the intermediate and low pressure sections of the HRSG 10 (i.e., between the evaporator of the high pressure section and the evaporator(s) of the intermediate and/or low pressure sections). In an embodiment, the SCR system 50 is located just upstream from the economizer 30.

In addition to the SCR system 50, in one embodiment a first catalytic reactor 52 is provided that is configured to oxidize carbon monoxide in the exhaust gas 14, to produce carbon dioxide ($CO_2$). The SCR system 50 also includes an ammonia injection grid 54 downstream from the CO catalyst 52, which is configured to distribute vaporized ammonia ($NH_3$) into the flow of exhaust gas 14. The ammonia vapor mixes with the exhaust gas 14. This mixture then travels through a second catalytic reactor 56 where nitrogen oxides in the exhaust gas are converted into nitrogen and water. The SCR system 50 and the catalytic reactor 52, therefore, function to reduce both carbon dioxide and nitrogen oxide emissions.

Figure 3:
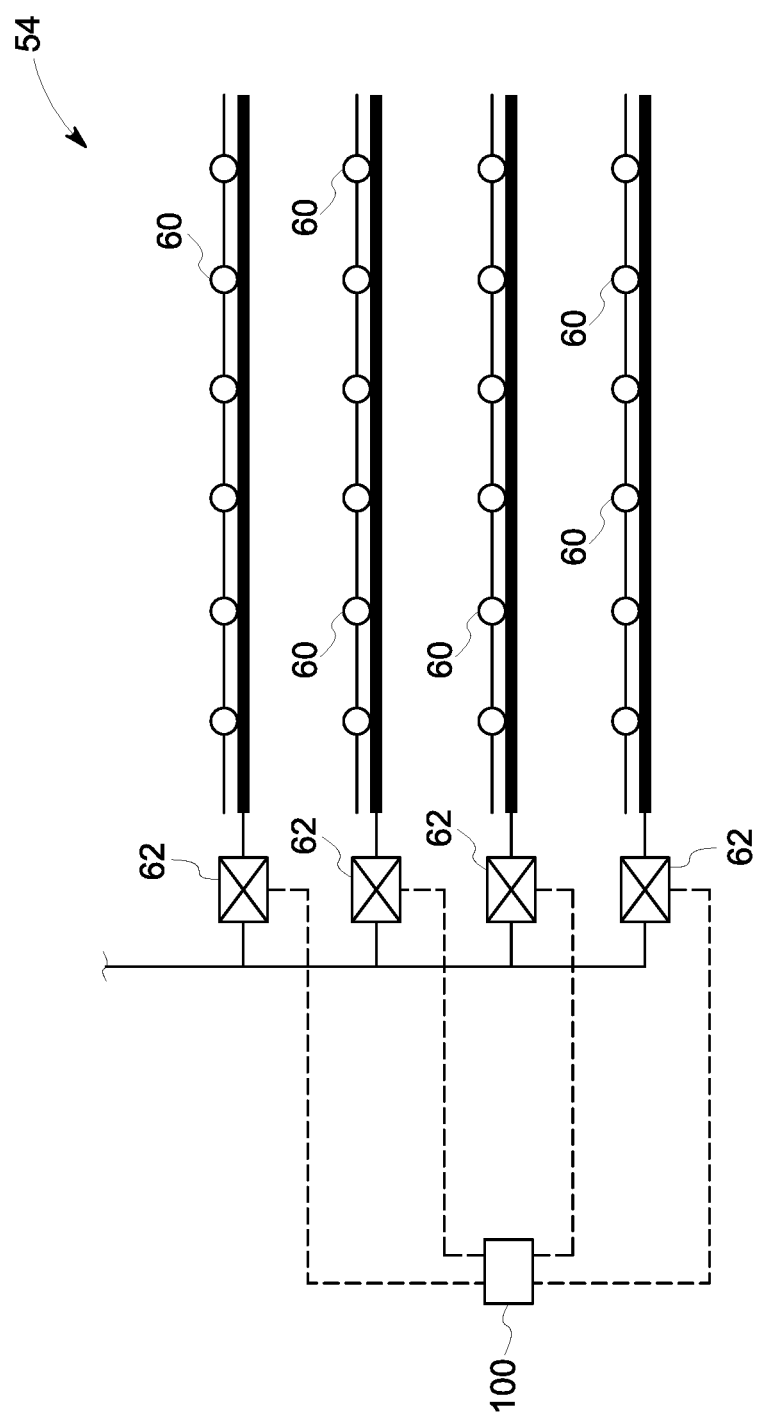
FIG. 3 is a schematic illustration of an ammonia injection grid of the heat recovery steam generator.

With reference to FIG. 3, the ammonia injection grid 54 includes a plurality of injection ports or nozzles 60 arranged in rows or levels that extend across the gas flow path within the heat recovery steam generator 10, and which are supplied with ammonia from an ammonia source (e.g., a reservoir) (not shown). A respective valve 62 is associated with each row or level. In an embodiment, the valves 62 are throttle valves, although the valves 62 may be any type of mechanically, electronically, hydraulically or pneumatically-controlled valves known in the art without departing from the broader aspects of the invention. The valves 62 are communicatively coupled to a control unit or controller 100, which is operable to control a position of the valves 62 in order to control the flow rate and/or amount (e.g., mass flow) of ammonia that is permitted to pass to the nozzles 60 within the rows.

In an embodiment, the valves 62 associated with the rows of nozzles 60 are individually controllable such that the amount of ammonia provided to each row or level may be independently controlled without regard to the amount of ammonia provided to the nozzles 60 within the other rows, such that the spatial distribution of ammonia across the exhaust gas flowpath can be modified. While FIG. 3 illustrates a respective valve 62 associated with each row of nozzles 60, the invention is not so limited in this regard. In particular, in certain embodiments, each injection port or nozzle 60 may have a valve 62 associated therewith so that the amount and/or flow rate of ammonia provided to each nozzle 60 may be independently controllable, so that the spatial distribution of ammonia an be modified. As discussed hereinafter, the valves 62 allow for precise control over the amount and location of ammonia injection in the HRSG 10, allowing the SCR system 50 to be tuned to the specific operating characteristics of the HRSG 10 at any given time. As used herein, "spatial distribution" means the specific cross-sectional locations or areas of ammonia injection in the exhaust gas flowpath. For example, certain rows of nozzles 60 may be "turned off" while other rows are "turned on" so that, for example, ammonia is injected into the exhaust gas adjacent a top of the exhaust gas flowpath, but not adjacent a bottom of the flowpath.

Referring once again to FIG. 2, the HRSG 10 also includes first and second continuous emissions monitoring systems (CEMS) or devices 70, 72. The CEMS 70, 72 may take any form of emissions monitoring system known in the art. For example, the CEMS 70, 72 may include a measurement grid that extends across a gas flow path and includes one or more probes or sensors configured to monitor at least one of the temperature, velocity and concentrations and/or presence of nitrogen oxide, carbon dioxide, carbon monoxide, ammonia and oxygen within the gas flow. As illustrated in FIG. 2, in an embodiment, the first emissions monitoring system/device 70 is located at the outlet 16 of the gas turbine 18, upstream from the SCR system 50, and the second emissions monitoring system 72 is located within the stack 34, downstream from the SCR system 50. In an embodiment, the first and second CEMS 70, 72 may be located anywhere upstream and downstream, respectively, from the SCR system 50. The CEMS 70, 72 are electrically and/or communicatively coupled to the control unit 100. In operation the CEMS 70, 72 monitor various parameters of the exhaust gas from the gas turbine 18 and transmit such data to the control unit for further use in controlling the HRSG 10 and the SCR system 50, as discussed in detail below.

In an embodiment, the CEMS 70, 72 are configured to transmit measurement data to the control unit 100. As indicated above, the measurement data includes at least nitrogen oxide, ammonia and oxygen measurements taken from the gas flow across the respective measurement grids. In an embodiment, the CEMS 70, 72 itself, or the control unit 100, is configured to convert the measurement data into averaged values (i.e., averaged over the measurement grid cross-section) for the various parameters being monitored. In other embodiments, a standard CEMS 72 downstream from the ammonia injection grid 54 may utilize a single extraction point for measuring emission parameter values, which may be considered as representative for the whole cross-section.

The control unit 100 is configured control the ammonia injection grid 54 in dependence upon one or more operational parameters of the HRSG 10 and the values for nitrogen oxide, ammonia and oxygen concentrations within the exhaust gas. In particular, the control unit 100 is configured to automatically and continuously adjust one or more of the throttle valves 62 of the ammonia injection grid 54 in dependence upon the make-up of the exhaust gas and the particular load conditions under which the HRSG 10 is operating, to optimize the SCR system 50. In an embodiment, optimizing the SCR system 50 includes controlling nitrogen oxide emissions to within a predetermined threshold range (such as dictated by environmental regulations), while simultaneously minimizing ammonia slip. As used herein, "automatically" means without manual intervention or input by a human operator and as part of the control routine executed by the control unit 100.

Figure 4:
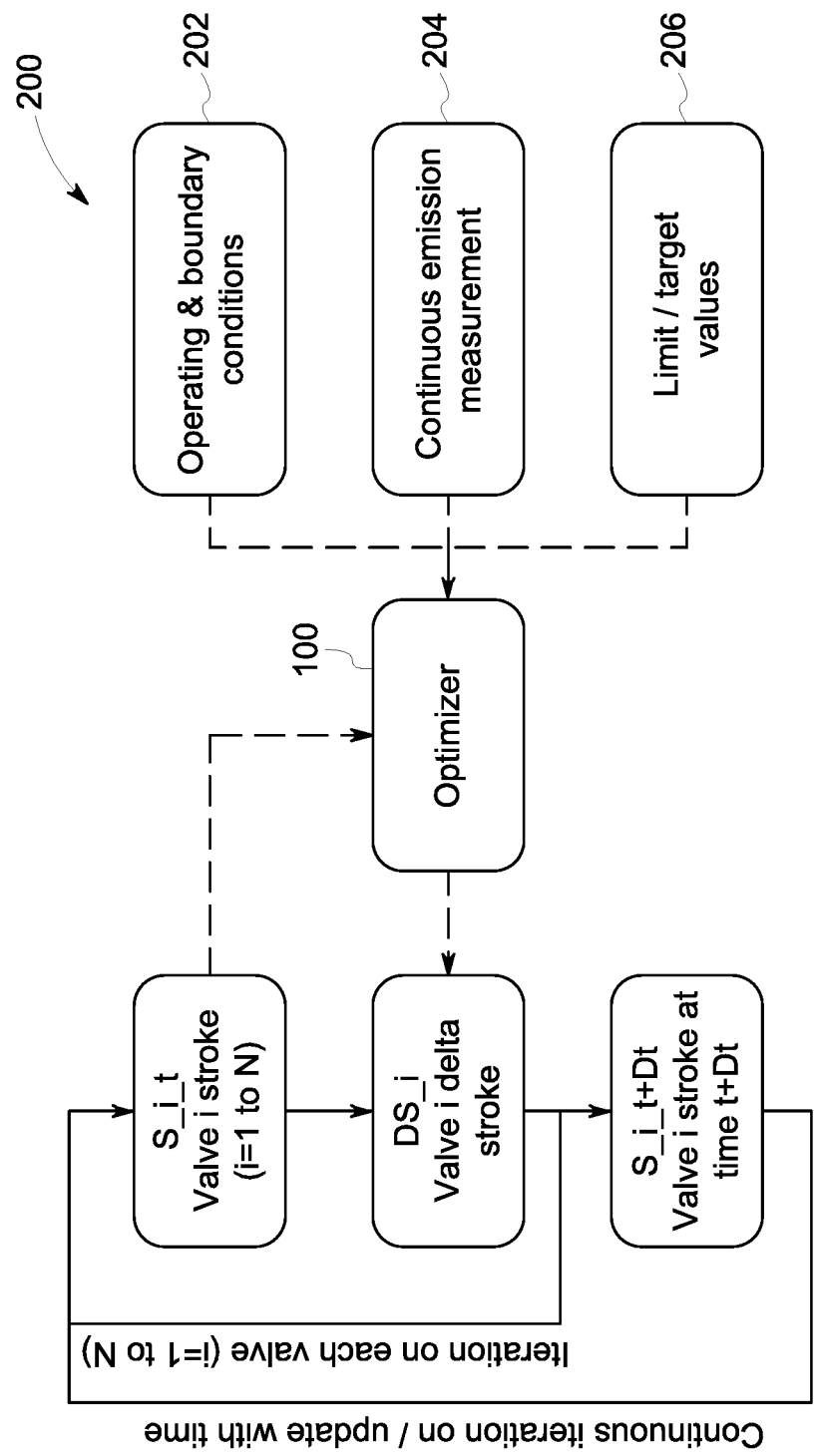
FIG. 4 is a schematic illustration of a control routine embodied in a control unit of the heat recovery steam generator.

As illustrated in FIG. 4, an adaptive control routine 200 used by the control unit 100 to optimize SCR system operation is illustrated. As shown therein, the optimizer of the control unit 100 is configured to receive a plurality of inputs including, for example, operating and boundary conditions 202 (such as system load, temperature, etc.), continuous emission measurements 204 (e.g., from CEMS 70, 72 for $NO_x$, $NH_3$ and $O_2$) and limit/target values 206 for such emission parameters (e.g. target or thresholds for $NO_x$, $NH_3$ and $O_2$). In dependence upon these inputs, the control unit 100 is configured to determine optimal positions for the valves 62 of the ammonia injection grid 54 in order to achieve a desired spatial distribution of ammonia within the exhaust gas flowpath, in order to minimize $NO_x$ emissions while also minimizing ammonia slip.

In an embodiment, in operation, initial (first) measurements are taken from the exhaust gas passing through the HRSG 10 at CEMS 72 and communicated to the control unit 100. These measurements include measurements of nitrogen oxides (including NO and $NO_2$), ammonia and oxygen. The control unit 100 then selects initial valve position settings for the ammonia injection grid 54 based on a self-learning algorithm stored in memory of the control unit 100, and adjusts the valves 62 to such positions in an attempt to control emissions within target thresholds. Subsequent (second) measurements of nitrogen oxide (including NO and $NO_2$), ammonia and oxygen concentrations in the exhaust gas are then taken downstream from the injection grid 54 with CEMS 72, and are communicated to the control unit 100. In an embodiment, the measurements may be continuous or may occur at predetermined time intervals. These second measurements are then compared to predetermined emissions targets for the monitored parameters stored in memory. If the emissions targets are not fulfilled, the process described above is repeated. In particular, if the emissions targets are not fulfilled, the control unit 100 adjusts the valves 62 in order to change the ammonia injection amount at one or more levels of the ammonia injection grid 54 (e.g., decrease the amount of ammonia injection from certain row(s) and/or increase the amount of ammonia injection from other row(s)), and again measures the concentrations of nitrogen oxides, ammonia and oxygen within the exhaust gas to assess whether the updated valve positions were effective (i.e., whether the changes made to the respective valve positions and corresponding changes in the spatial distribution of ammonia injection resulted in bringing emissions within target thresholds).

For example, in an embodiment, if the measurements indicate that $NO_x$ concentrations are above threshold levels, the control unit 100 may control the valves 62 to provide for a modified spatial distribution of ammonia across the gas flow path (e.g., a greater amount of ammonia injection at certain nozzles or rows within the injection grid and/or a lesser amount of ammonia injection at other nozzles or rows within the injection grid), and then verify (via subsequent measurements) whether such changes were effective in reducing $NO_x$ concentrations to within threshold ranges. If such changes were not effective, additional valve adjustments are automatically made to further modify the spatial distribution of ammonia, and verifying measurements taken until the $NO_x$ concentrations are controlled within the threshold ranges. In addition, if the changes were not effective or were effective, the control unit 100 may log a record of the valve positions at the particular operating conditions at which such changes were made for further use in the control routine. In this respect, the control unit 100 is configured to record the optimum valve settings for specific operating conditions, for later use in the control routine (at least for preliminary valve settings for a given operating condition).

Similarly, if the measurements indicate that $NO_x$ concentrations are below threshold levels (i.e., within permissible ranges), but the amount of ammonia within the exhaust exiting the stack 34 is greater than desired (i.e., ammonia slip condition), the control unit 100 may control the valves 62 to provide for a different spatial distribution of ammonia, and then verify (via subsequent measurements) whether such changes were effective in reducing the amount of ammonia present in the exhaust gas exiting the stack 34 while also maintaining $NO_x$ concentrations below thresholds. As discussed above, due to the provision of valves 62 at each level of the ammonia injection grid 54, fine-tuning of ammonia injection is possible, which provides a greater level of control over the reactions (or lack of reactions) that take place in the SCR system 50 in order to optimize emission control. As indicated above, optimization targets for the system may include nitrogen oxide and/or ammonia emissions, but can also include ammonia injection mass flow and/or a weighted combination of nitrogen oxide emissions, ammonia emissions and/or ammonia injection mass flow.

In connection with the above, in an embodiment, the optimizer of the control unit 100 is a self-learning optimizer that stores valve stroke as a function of operating and boundary conditions and/or stores the impact/effect of valve stroke change on control parameters, for use in SCR system 50 optimization, as indicated above, and regularly updates its tables/functions based on newly acquired measurement data. In this respect, the control unit 100 is configured to store determined optimal valve position configurations for the injection grid 54 at various operating and boundary conditions for easy retrieval an implementation, allowing the control unit to quickly adapt based on previously used inputs. In an embodiment, the optimizer of the control unit 100 is a predictive optimizer that uses pre-defined relationships between input and control parameters and/or uses learned relationships between input and control parameters and, based on these pre-defined and/or learned relationships, predicts the impact of a valve stroke change and uses this to define a target valve stroke change and/or predicts the impact of a boundary and/or operating condition change and uses this to define the target stroke change.

In an embodiment, the control unit 100 may be configured to perform recalculation of optimal valve positions when emissions thresholds and/or boundary/operating conditions are exceeded. In an embodiment, the control unit 100 is configured to perform recalculation of optimal valve positions when changes in the emissions levels or boundary/operating conditions exceed predefined limits. In yet other embodiments, the control unit is configured to perform recalculation of optimal valve positions at predetermined time intervals.

The system and method of the invention therefore provide for an improvement in nitrogen oxide conversion while reducing ammonia slip. In particular, the control routine executed by the control unit allows for continuous, automatic tuning of the ammonia injection grid and SCR system as a whole, based on CEMS measurements of the exhaust gas and operating parameters/boundary conditions of the HRSG. By optimizing the position of the individual flow valves of the ammonia injection grid in this manner, a high level of nitrogen oxide reduction can be achieved while maintaining ammonia slip at a minimum. In connection with the above, the system and method of the invention allow for the optimum valve settings for specific operating conditions (e.g., load) to be determined, and for the optimal valve settings to be adjusted for both different operating conditions and for changes that may occur during operation but which are not directly measureable (e.g., equipment aging, gas turbine emission degradation, etc.).

Moreover, as measurement systems and devices are already present in existing HRSGs and other systems (e.g., at least a measurement device downstream from the ammonia injection grid 54), no additional measurement equipment is required. In addition, by performing the optimization routine and valve control automatically and continuously, no manual intervention or adjustments are required. The method described herein can be executed continuously, and quickly, can be run during standard plant operation.

In addition to the above, in systems that include both upstream and downstream emission measurement devices (e.g., CEMS 70 and 72), measurement data received from CEMS 70 by the control unit 100 may be used to calculate the SCR removal efficiency (by comparison of values measured at CEMS 70 versus at CEMS 72), as a criterion to determine when optimal tuning optimum is reached and/or when re-tuning is needed.

In an embodiment, a method for controlling emissions from a power plant having an ammonia injection grid that includes a plurality of ammonia injection points is provided. The method includes the steps of, with an ammonia injection grid having a plurality of ammonia injection points, injecting ammonia into a flow of exhaust gas at an injection location, the injection of ammonia defining a spatial distribution of ammonia across an exhaust gas flowpath, measuring at least one parameter of the exhaust gas downstream from the injection location, comparing a measured value for the at least one parameter of the exhaust gas to a threshold value for the at least one parameter and, if the measured value for the at least one parameter exceeds the threshold value for the at least one parameter, automatically modifying the spatial distribution of ammonia injection across the exhaust gas flowpath. In an embodiment, the at least one parameter is a plurality of parameters including nitrogen oxide, ammonia and oxygen within the exhaust gas. In an embodiment, the injection points of the ammonia injection grid are arranged in rows, each row having a control valve associated therewith for controlling a flow of the ammonia provided to the injection points, and the step of modifying the spatial distribution of ammonia across the exhaust gas flowpath includes adjusting a position of at least one of the control valves. In an embodiment, the step of measuring the nitrogen oxide, ammonia and oxygen in the exhaust gas occurs at least one of continuously or at predetermined time intervals. In an embodiment, the method may also include determining a position for at least one of the control valves prior to adjusting the position of the at least one of the control valves. In an embodiment, the steps of determining a position for the control valves and adjusting the position of the control valves occurs automatically whenever the measured value for at least one of nitrogen oxide, ammonia and oxygen exceeds a threshold value for nitrogen oxide, ammonia and oxygen, or when an operating condition exceeds a threshold value for the operating condition, wherein the operating condition includes at least one of a temperature of the exhaust gas, a velocity of the exhaust gas and a system load. In an embodiment, the steps of determining a position for the control valves and adjusting the position of the control valves occurs automatically whenever a change in the measured value for at least one of nitrogen oxide, ammonia and oxygen exceeds a predetermined limit, or when a change in an operating condition exceeds a predetermined limit, wherein the operating condition includes at least one of a temperature of the exhaust gas, a velocity of the exhaust gas and a system load. In an embodiment, the at least one parameter is measured at a location upstream from the injection point and at a location downstream from the injection point. In an embodiment, method may include the steps of determining preliminary positions for the control valves based on previously acquired measurement data, and controlling the control valves to the preliminary positions.

In another embodiment, a heat recovery steam generator is provided. The heat recovery steam generator includes a gas inlet for receiving a flow of exhaust gas from a gas turbine, a gas outlet opposite the gas inlet and configured to transport the flow of exhaust gas to atmosphere, an ammonia injection grid having a generally planar array of injection ports configured to inject ammonia into the flow of exhaust gas at various locations along a cross-section of an exhaust gas flow path, a measurement system located intermediate the ammonia injection grid and the gas outlet, and a control unit configured to receive emission measurement data from the measurement system and to modify a spatial distribution of ammonia from the ammonia injection grid in dependence upon the emission measurement data. In an embodiment, the ammonia injection grid includes a plurality of valves, each valve being associated with a respective subset of the plurality of injection ports, wherein the control unit is configured to control a position of each of the valves to control the spatial distribution of ammonia in the exhaust gas. In an embodiment, the measurement data includes measured values for nitrogen oxide, ammonia and oxygen in the exhaust gas, and the control unit is configured to compare the measured values for nitrogen oxide, ammonia and oxygen in the exhaust gas from the measurement system to threshold values for nitrogen oxide, ammonia and oxygen, respectively, and, if one of the measured values exceeds the threshold value, automatically adjusting the position of at least one of the valves of the ammonia injection grid to modify the spatial distribution of ammonia. In an embodiment, the measurement system is configured to continuously acquire the emission measurement data and to transmit the emission measurement data to the control unit. In an embodiment, the control unit is configured to adjust the position of at least one of the valves of the ammonia injection grid whenever one of the measured values for nitrogen oxide, ammonia and oxygen in the exhaust gas from the measurement system exceeds the threshold value for nitrogen oxide, ammonia and oxygen, or when an operating condition exceeds a threshold value for the operating condition, wherein the operating condition includes at least one of a temperature of the exhaust gas, a velocity of the exhaust gas and a system load. In an embodiment, the control unit is configured to adjust the position of at least one of the valves of the ammonia injection grid whenever a change in one of the measured values for nitrogen oxide, ammonia and oxygen in the exhaust gas from the measurement system exceeds a predetermined limit, or when a change in an operating condition exceeds a predetermined limit, wherein the operating condition includes at least one of a temperature of the exhaust gas, a velocity of the exhaust gas and a system load. In an embodiment, the control unit is configured to determine preliminary positions for the valves based on previously acquired measurement data and to control the control valves to the preliminary positions. In an embodiment, the heat recovery steam generator includes a second measurement system located intermediate the gas inlet and the ammonia injection grid, wherein the measurement system located intermediate the ammonia injection grid and the gas outlet is located adjacent to the gas outlet, and wherein the second measurement system is located adjacent to the gas inlet.

In yet another embodiment, a method for controlling emissions is provided. The method includes the steps of receiving first emission measurement data including at least first measured values for nitrogen oxide, ammonia and oxygen in a flow of exhaust gas, determining preliminary positions for flow control values of an ammonia injection grid based on historical valve positions stored in memory, controlling the flow control valves to the determined preliminary positions to provide a first spatial distribution of ammonia in a gas flow path, receiving second emission measurement data including at least second measured values for nitrogen oxide, ammonia and oxygen in the exhaust gas, comparing the second measured values to threshold values for nitrogen oxide, ammonia and oxygen, if at least one of the second measured values exceeds the corresponding threshold value, determining adjusted positions for the flow control valves, and controlling the flow control valves to the adjusted positions to provide a second spatial distribution of ammonia in the gas flow path, wherein the first spatial distribution of ammonia is different from the second spatial distribution of ammonia. In an embodiment, the method may also include repeating the steps of receiving measured values for nitrogen oxide, ammonia and oxygen, determining adjusted positions for the flow control valves, and controlling the flow control valves to the adjusted positions if at least one of the measured values exceeds the corresponding threshold values. In an embodiment, the first and second emission measurement data are received from a measurement device located downstream from the ammonia injection grid.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A heat recovery steam generator, comprising:
   a gas inlet for receiving a flow of exhaust gas from a gas turbine;
   a gas outlet opposite the gas inlet and configured to transport the flow of exhaust gas to atmosphere;
   an ammonia injection grid having a generally planar array of injection ports configured to inject ammonia into the flow of exhaust gas at various locations along a cross-section of an exhaust gas flow path, the ammonia injection grid including a plurality of valves, each valve being associated with a respective subset of the injection ports;
   a measurement system located intermediate the ammonia injection grid and the gas outlet; and
   a control unit configured to: receive emission measurement data from the measurement system; to modify a position of each valve of the plurality of valves to thereby modify a spatial distribution of ammonia in the exhaust gas from the ammonia injection grid in dependence upon the emission measurement data; determine, at the modified spatial distribution, whether a NOx concentration in the exhaust gas is within a threshold range, wherein in the event the determined NOx concentration in the exhaust gas is not within the threshold range, the control unit is configured to further adjust the position of each valve of the plurality of valves, and wherein in the event the determined NOx concentration in the exhaust gas is within the threshold range, the control unit is further configured to record the respective valve position based on an operating condition at the time of the valve adjustment; and determine an optimum valve setting for each valve at the operating condition based on the recorded positions.

2. The heat recovery steam generator of claim 1, wherein:
   the measurement data includes measured values for nitrogen oxide, ammonia and oxygen in the exhaust gas; and
   wherein the control unit is configured to compare the measured values for nitrogen oxide, ammonia and oxygen in the exhaust gas from the measurement system to threshold values for nitrogen oxide, ammonia and oxygen, respectively, and, if one of the measured values exceeds the threshold value, automatically adjusting the position of at least one of the valves of the ammonia injection grid to modify the spatial distribution of ammonia.

3. The heat recovery steam generator of claim 2, wherein:
   the measurement system is configured to continuously acquire the emission measurement data and to transmit the emission measurement data to the control unit.

4. The heat recovery steam generator f claim 3, wherein:
   the control unit is configured to adjust the position of at least one of the valves of the ammonia injection grid whenever:
   one of the measured values for nitrogen oxide, ammonia and oxygen in the exhaust gas from the measurement system exceeds the threshold value for nitrogen oxide, ammonia and oxygen; or
   an operating condition exceeds a threshold value for the operating condition;
   wherein the operating condition includes at least one of a temperature of the exhaust gas, a velocity of the exhaust gas and a system load.

5. The heat recovery steam generator of claim 3, wherein:
   the control unit is configured to adjust thy: position of at least one of the valves of the ammonia injection grid whenever:
   a change in one of the measured values for nitrogen oxide, ammonia and oxygen in the exhaust gas from the measurement system exceeds a predetermined limit; or
   a change in an operating condition exceeds a predetermined limit;
   wherein the operating condition includes at least one of a temperature of the exhaust gas, a velocity of the exhaust gas and a system load.

6. The heat recovery steam generator of claim 2, wherein:
   the control unit is configured to determine a respective preliminary position for each valve based on the respective recorded valve position and to adjust the valves to the preliminary positions.

7. The heat recovery steam generator of claim 1, further comprising:
   a second measurement system located intermediate the gas inlet and the ammonia injection grid;

wherein the measurement system located intermediate the ammonia injection grid and the gas outlet is located adjacent to the gas outlet; and wherein the second measurement system is located adjacent to the gas inlet.

* * * * *